United States Patent
Fellingham et al.

(10) Patent No.: US 6,442,244 B1
(45) Date of Patent: Aug. 27, 2002

(54) METHOD AND APPARATUS FOR SELECTIVE AUDIO LOGO AND/OR ANNOUNCEMENTS IN A TELECOMMUNICATIONS NETWORK

(75) Inventors: Paul J. Fellingham, Holmdel; Christopher P. Gilboy, Freehold, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/170,910

(22) Filed: Oct. 13, 1998

(51) Int. Cl.$^7$ .................. H04M 1/64; H04M 15/00; H04M 7/00

(52) U.S. Cl. ............ 379/76; 379/67.1; 379/93.12; 379/114.13; 379/121.02; 379/201.01; 379/220.01

(58) Field of Search .................. 379/67.1, 70, 71, 379/72, 76, 88.04, 88.11, 88.2, 88.21, 93.12, 100.04, 113, 114, 115, 127, 133, 134, 142, 136, 201, 203, 219, 220, 242, 243, 245, 258, 265, 308, 309, 321, 114.12, 114.13, 115.01, 115.02, 121.02, 127.04, 127.05, 201.01, 201.12, 220.01, 221.02, 265.01, 260

(56) References Cited

U.S. PATENT DOCUMENTS

| | | | |
|---|---|---|---|
| 4,825,460 A | 4/1989 | Carter et al. .................. 379/67 |
| 4,850,007 A | * 7/1989 | Marino et al. ................. 379/67 |
| 4,901,341 A | 2/1990 | Carter et al. .................. 379/67 |
| 4,930,154 A | 5/1990 | Bauer et al. ................. 379/246 |
| 5,036,533 A | 7/1991 | Carter et al. .................. 379/59 |
| 5,056,134 A | * 10/1991 | Bauer et al. ................. 379/246 |
| 5,210,789 A | * 5/1993 | Jeffus et al. ................. 379/127 |
| 5,287,403 A | 2/1994 | Atkins et al. ................ 379/144 |
| 5,341,414 A | * 8/1994 | Popke ......................... 379/142 |
| 5,381,465 A | 1/1995 | Carter et al. .................. 379/67 |
| 5,487,107 A | 1/1996 | Atkins et al. ................ 379/144 |
| 5,506,894 A | 4/1996 | Billings et al. .............. 379/127 |
| 5,539,809 A | 7/1996 | Mayer et al. ................. 379/67 |
| 5,557,658 A | * 9/1996 | Gregorek et al. .............. 379/67 |
| 5,661,781 A | 8/1997 | DeJager ....................... 379/67 |
| 5,703,935 A | * 12/1997 | Raissyan et al. ............... 379/88 |
| 5,754,628 A | 5/1998 | Bossi et al. ................... 379/67 |
| 5,909,486 A | * 6/1999 | Walker et al. ............... 379/144 |
| 5,943,403 A | * 8/1999 | Richardson, Jr. et al. 379/88.26 |
| 5,946,386 A | * 8/1999 | Rogers et al. .............. 379/265 |
| 5,970,133 A | * 10/1999 | Salimando .................. 379/213 |
| 6,157,709 A | * 12/2000 | Lawser et al. .............. 379/220 |
| 6,301,350 B1 | * 10/2001 | Henningson et al. .. 379/220.01 |

OTHER PUBLICATIONS

Now allowed (Aug. 03, 1998) Application Begeja 2–4–7–2–1–2–1–6, filed with the US Patent Office on Mar. 28, 1996, Ser. No. 08/767358, entitled, Method And Apparatus For Applying Multiple Speech Processing Features To A Telephone Call.

(List continued on next page.)

*Primary Examiner*—Allan Hoosain
(74) *Attorney, Agent, or Firm*—Robert B. Levy

(57) ABSTRACT

A calling party may receive an audio logo or an audible announcement during a telecommunications call. Upon receipt of the call, a switch (30) within a network (10) accesses a service database (40) to determine if the call should receive an audio logo or audible announcements during call set-up. This determination is based on call attribute information such as the calling party number, the dialed number, the carrier identification code, trunk group characteristics, and/or "II" digits; and pre-provisioned data arrays, such as lists of originating numbers, destination numbers, carrier identification codes, trunk group characteristics, and/or II digits that should or should not receive an announcement or announcements. An announcement frame (50) in the switch (30) plays the announcement(s) to the calling party, while the switch simultaneously sets up the call to the called party (70). If the switch detects answering of the call by the called party while an announcement is still playing, the announcement will be abruptly terminated.

13 Claims, 2 Drawing Sheets

OTHER PUBLICATIONS

Application Dunn 2–3–2–7–11, filed with the US Patent Office on Jan. 16, 1998, Ser. No. 09/008639, entitiled, Wireless Telephone Menu System.

Application Hopkins 1, filed with the US Patent Office on Jun. 3, 1997, Ser. No. 08/868401, entitled, A Method for Time–Stamping A Message Based On A Recipient Location.

Application Lawser 3–2, filed with the US Patent Office on Dec. 11, 1997, Ser. No. 08/988817, entitled, Method And Apparatus for Branding Delivered Calls.

Application Peterson 1, filed with the US Patent Office on May 14, 1997, Ser. No. 08/856068, entitled, Method And Apparatus For Providing Information Messages Within A Communications Network.

Application Salimando 8, filed with the US Patent Office on Jul. 12, 1995, Ser. No. 08/678933, entitled, Call Branding System.

* cited by examiner

METHOD AND APPARATUS FOR SELECTIVE AUDIO LOGO AND/OR ANNOUNCEMENTS IN A TELECOMMUNICATIONS NETWORK

TECHNICAL FIELD

This invention relates to a technique for selectively applying an audio logo and/or audible announcement(s) to the calling party of a telephone call placed over a telecommunications network.

BACKGROUND ART

Presently, some providers of telecommunications services, such as AT&T, provide an audible logo during the set-up of a telephone call to inform the caller that the call is being completed by that service provider. Placing an audible logo during call set-up is commonly referred to as "branding" the call. U.S. Pat. Nos. 4,930,154 and 5,056,134, both issued in the name of T. M. Bauer, et al., and assigned to AT&T (incorporated by reference herein) both describe techniques for ubiquitously branding a call to identify the Inter-Exchange carrier (IXC) that carried the call. U.S. Pat. No. 5,539,809 issued in the name of by D. J. Mayer, et al. and assigned to AT&T (incorporated by reference herein), discloses a technique for providing a message to the calling party during call set-up. The message may include the time of day at the called party location, news, weather, or other information specific to the geographic location of the calling and/or called party.

Prior art techniques for accomplishing branding of calls and for providing informational announcements suffer from several disadvantages. First, ubiquitous branding of all calls as taught by the prior art is not always desirable because certain callers will be annoyed or offended by the branding and/or announcement. For example, entities that place large volumes of outbound calls, such as telemarketers, typically will object to call branding and/or announcements because such branding and/or announcements become irritating over time and may impede the speed and which calls are placed. For this reason, telemarketers would likely choose a different telecommunications service provider to avoid call branding and/or announcements.

Some callers may prefer to receive branding or announcements but may request that the telecommunications service provider tailor the announcements during their calls. Prior art call branding and announcement techniques provide no selectivity. Rather, callers typically receive a single type of branding or announcement message.

Another disadvantage of prior art branding and announcement techniques is that the branding and/or announcement(s) occur prior to the connection of the caller to the called party may require long post-dial delays and can sometimes effectively delay call setup. Delaying call setup invariably dissatisfies most if not all customers. Moreover, advances in telecommunications have lead to continuing decreases in the average post-dial delay, leaving less available time during which to play announcements. Additionally, prior art call branding and announcement techniques usually do not afford the ability to immediately terminate the message should the called party answer before normal message completion. Most subscribers would likely object to continued branding and/or announcements after answering by the called party.

Given the aforementioned disadvantages, a telecommunications service provider could risk losing customers by ubiquitous application of branding and/or announcements in accordance with the teachings of the prior art. Thus, there is a need for a technique for providing branding and/or announcements that overcomes such disadvantages.

BRIEF SUMMARY OF THE INVENTION

Briefly, the present invention provides a technique for determining which if any of a selected audible logo and an announcement are provided to a calling party during setup of a telephone call placed by a calling party to a called party across at least one telecommunications network that carries the call on a trunk group from an originating line. In accordance with the invention, the network establishes at least one call attribute for the call and then compares the established attributes(s) to pre-provisioned information stored in a database to determine if a match exists between the attribute(s) and the pre-provisioned data. If such a match exists, then the network selects an audible logo and/or an announcement based on such a match and thereafter provides the selected logo and/or announcement to the calling party prior to call completion.

The call attribute may comprise the calling party number (CPN) while the pre-provisioned data would comprise lists of originating telephone numbers, or at least portions of originating numbers. Each list of numbers has an associated indicator that indicates whether at least one of an audible logo and announcement should be provided, and if so, an identifier of the at least one of the logo and announcement to be provided. Based on the called party's number, the network would provide (or not provide) a particular audio logo and/or announcement.

Alternatively, the call attribute may comprise the dialed (called party's) number while the pre-provisioned data would comprise lists of destination numbers, or at least portions of destination numbers (such as a country code, NPA, or NPA-NXX). Each list of numbers has an associated indicator that indicates whether at least one of an audible logo and announcement should be provided, and if so, an identifier of the at least one of the logo and announcement to be provided. Based on the called party's number, the network would provide (or not provide) a particular audio logo and/or announcement.

The call attribute may comprise the carrier identification code (CIC) associated with the telecommunications service provider that is to carry the call while the pre-provisioned data would comprise lists of CIC codes. Each list of numbers has an associated indicator that indicates whether at least one of an audible logo and announcement should be provided, and if so, an identifier of the at least one of the logo and announcement to be provided. Based on the CIC code, the network would provide (or not provide) a particular audio logo and/or announcement.

A forth call attribute may comprise the trunk group characteristics, that is the characteristic of the trunk group within the telecommunications service provider network that carried the call. The corresponding pre-provisioned data would comprise lists of trunk group characteristics (such as trunk group number and/or trunk group signaling type). Each list of numbers has an associated indicator that indicates whether at least one of an audible logo and announcement should be provided, and if so, an identifier of the at least one of the logo and announcement to be provided. Based on the trunk group characteristics, the network would provide (or not provide) a particular audio logo and/or announcement A fifth call attribute may comprise Originating Line Information (OLI) or "II" digits while the pre-provisioned data would comprise lists of II digits. Each list of II digits has an associated indicator that indicates whether at least one of an audible logo and announcement should be provided, and if so, an identifier of the at least one of the logo and announcement to be provided. Based on the II digits, the network would provide (or not provide) a particular audio logo and/or announcement.

Indeed, the call attribute may comprise a combination of two or more of the following: (1) the calling party number, (2) the dialed number, (3) the CIC, (4) the trunk group characteristics, and (5) the II digits. For example, the combination of a prescribed CIC and a destination number within a prescribed range of numbers could establish that a call will receive a specific logo and/or announcement associated with these two call attributes. Likewise, the combination of a specific calling party number and a destination number within a prescribed range of numbers could establish that a call receive a specific logo and/or announcement associated with such attributes.

By comparing the call attributes to the pre-provisioned data, and providing a selected one of an audible logo and/or announcement in accordance with such a match, the invention provides branding and/or announcements on selected calls, an advantage not achieved by the prior art.

DETAILED DESCRIPTION

Figure 1:
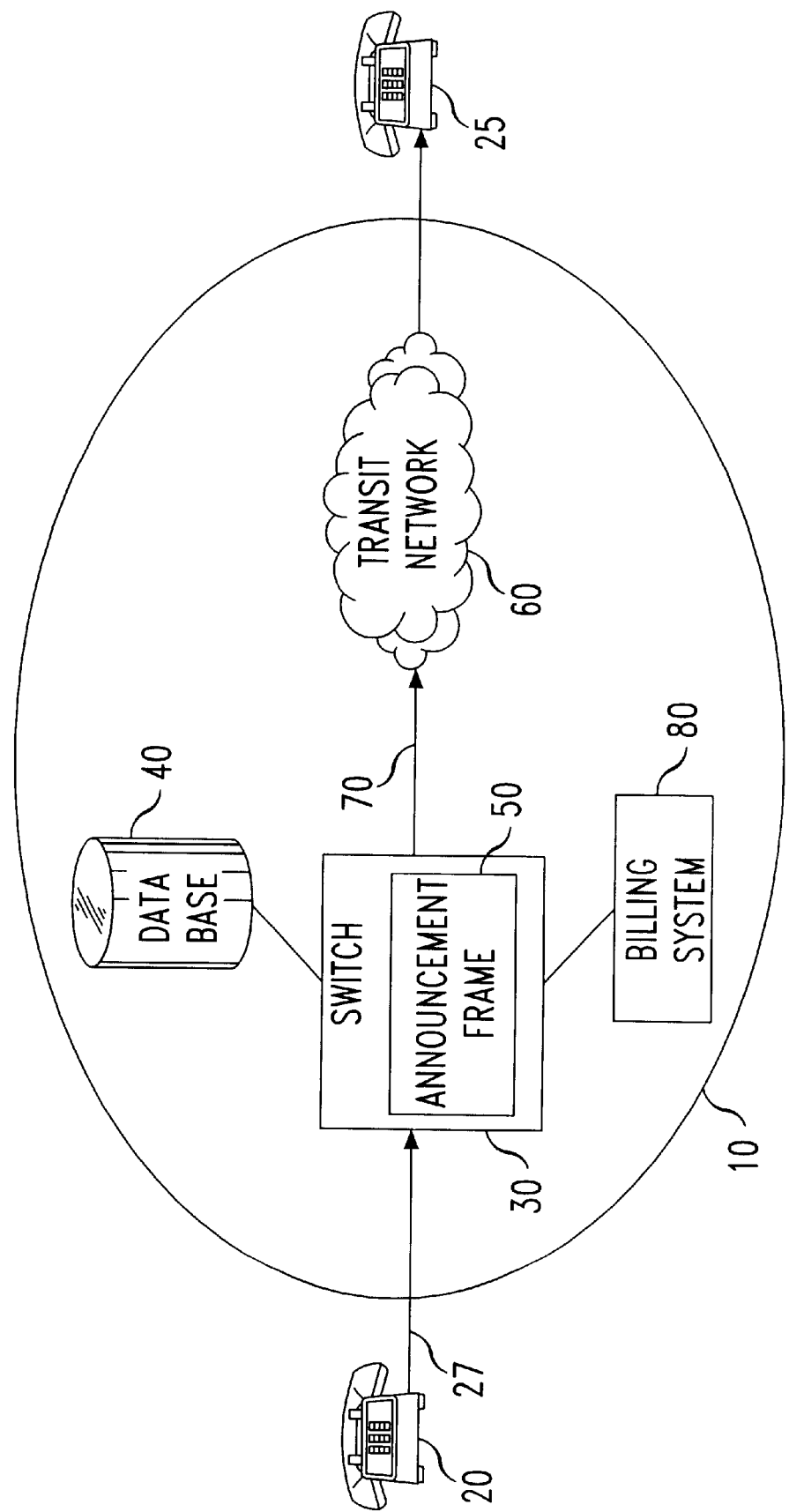
FIG. 1 is a block schematic diagram of a network for practicing the method of the invention.

FIG. 1 depicts a block schematic diagram of a telecommunications network 10 for completing a call between a calling party, represented by station set 20, and a called party, represented by station set 25. A call initiated by the calling party 20 will pass on the calling party's originating line 27 to a switch 30 for initial processing. The Switch 30, which typically takes the form of a local office switch, contains announcement frame 50. The announcement frame 50 has the capability of playing a single audible logo and/or an announcement or a string of concatenated announcements to the calling party 20. In practice, the announcement frame 50 provides the audible logo and/or announcement(s) during the process of setting up a call for passage to a transit network 60 via a trunk group 70 for routing by the transit network 60 to the called party 25. The transit network 60 may include an IXC carrier network, such as the network maintained by AT&T, or simply a local exchange carrier network, or a combination of both. The announcement frame 50, while depicted as an element of the switch 30, could reside in a separate adjunct (not shown) or as a separate standalone element shared by other switches.

In accordance with the invention, the switch 30, upon receipt of a call, passes information, in the form of one or more attributes associated with the call, to a database 40. The call attribute(s) may include data elements representative off one or more of the calling party number (CPN), the dialed number, the carrier identification code (CIC), the characteristics of the trunk group 70, and "II" digits (which contain station-type and call-type information associated with the line 27). Database 40 uses the call attribute information provided by switch 30 to determine if the calling party should receive an audible logo and/or one or more announcements, if so, what the logo and/announcements should be. The database 40 may comprise at least part of a Network or Service Control Point available to the switch 30, as well as other network switches (not shown).

The network 10 will typically include a billing system 80 for creating and storing billing records for calls transiting the switch 30. In accordance with an aspect of the invention, the billed party, which may be the calling or calling party depending on the service, may receive an adjustment (either a credit or debit) to their billing record based on whether the calling party receives a particular audible logo and/or message. For example, under some circumstances, when the calling party is the billed party, it may be desirable to provide that party with a discount (i.e., a credit) in exchange for receiving a selected advertising message. For certain services, such as in-bound 800 service for which the called party is the billed party, providing a particular audible logo and or message to the calling party at the request of the called party may give rise to an additional cost (i.e., a debit) to the called party. Alternatively, some calling parties may desire no branding whatsoever and may pay a premium for such service, requiring that the billing system 80 make an appropriate debit to the billing record.

Figure 2:
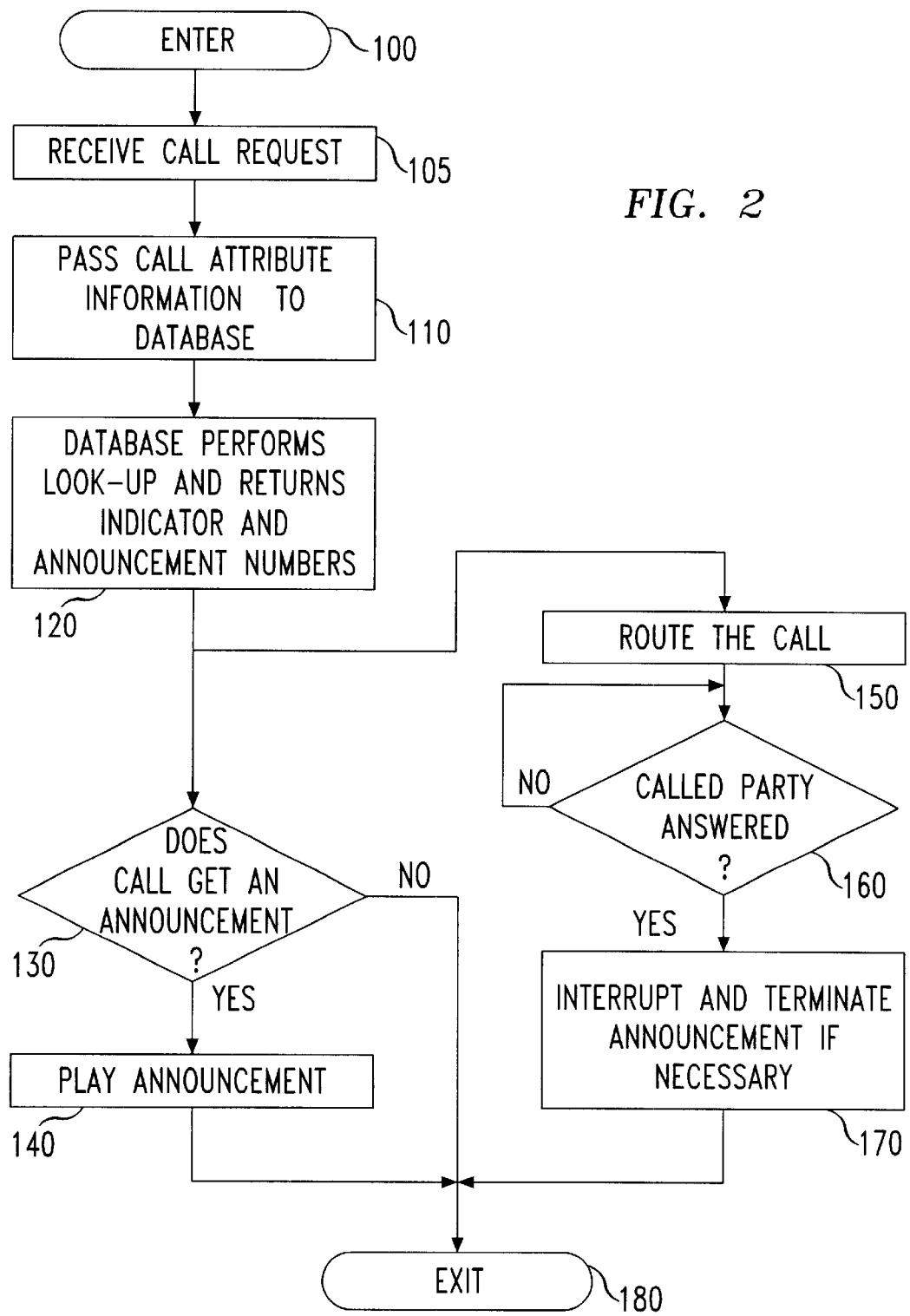
FIG. 2 is a flow diagram illustrating the steps executed by the network of FIG. 1 to selectively apply at least one of an audio logo and announcement to a telephone call.

FIG. 2 depicts a flow-chart diagram illustrating the steps of the method executed by the network 10 to selectively provide an audible logo and/or announcement in accordance with the present invention. The method commences at step 100 during which initialization occurs. Following initialization, the switch 30 of FIG. 1 awaits receipt of a call (i.e., a request) from the calling party (step 105). Upon receipt of the call, the switch 30 passes call attribute information to the database 40 (step 110). The call attribute information typically includes at least one, and possibly two or more of the following: (1) the Calling Party Number (CPN), (2) the Dialed Number (DN), (3) the Carrier Identification Code (CIC), (4) trunk group characteristics, and (5) "II" digits (which contain station-type information).

Upon receipt of the call attribute(s), the database 40 determines if the calling party should receive some type of audible logo and/or announcement and, if so, what the logo/announcement should be (step 120). As discussed above, the call attribute information provided to database 40 by switch 30 may comprise of a single attribute, or a combination any two or more of the following: (1) all or part of the calling party number, (2), all or part of the dialed number (3), the CIC, (4), the trunk group characteristics, and (5), the II digits.

To determine whether to provide a logo/announcement, and if so, which one to provide, the database 40 contains pre-provisioned data arrays. For example, a data array could include a list of Calling Party Numbers, a list of terminating numbers, a list of CIC codes, a list of trunk group numbers, and/or a list of II digits, each of which could be used in this determination. In making the logo/announcement determination, the database 40 applies a set of database rules, each specifying a particular action based on a match between a call attribute and an in a pre-provisioned data array. The following are illustrative of database rules:

all calls with Calling Party Number found within a particular database array get announcement number 1000, all calls to country code 41 (contained within the dialed number) get announcement numbers 1001 and 1002, all calls with CIC=10288 get announcement 1003, all calls with II=23 (coin phones) get announcement 1004, unless they are placed over a trunk group found within a particular database array, all calls being placed outside the calling party's time-zone get an announcement that plays the time at the called party's destination, where 1000–1004 are used to illustrate announcement numbers internal to announcement frame 50.

Once the determination during step 120, the database 40 returns an indicator that depicts if an announcement should be played or not for this call (for example, a Boolean TRUE or FALSE) and set of announcement numbers, if appropriate, to switch 30. In accordance with the invention, steps 130 and 150 begin execution in parallel.

During step 130, the switch 30 examines the returned indicator. If the returning indicator is negative, (indicating that no logo/announcement should be played), program execution branches to step 180, thus exiting the process. If the returning indicator is positive, the switch 30 causes the announcement frame 50 of FIG. 1 to play the appropriate announcement (step 140) and make an appropriate adjustment, as needed, to the billing record In particular, during step 140, the announcement frame 50 plays the announcements, corresponding to the returned set of announcement numbers, to the calling party.

As stated above, the switch 30 executes step 150 simultaneously with step 120. During step 150, the switch 30 routes the call placed by the calling party across transport network 60 to its destination. Since step 150 occurs in parallel with steps 120–140 the called party's telephone can experience ringing while the announcement is still being played to the calling party. During step 160, switch 30 monitors for the called party to answer and for network conditions such as busy, network announcements, etc. Once the called party answers, switch 30 executes step 170 and immediately cancels the announcement(s), if any, still being played to the calling party. This step insures that the calling party can hear the called party answer the call. If other network conditions are detected, the switch may either cancel the announcement(s), if any, still being played to the calling party, or, preferably, play the announcement to completion before connecting the caller to the appropriate tone/announcement (e.g., busy tone).

The foregoing describes a technique for selectively providing (or not providing) an audible logo and/or announcement to a caller.

The above-described embodiments merely illustrate the principles of the invention. Those skilled in the art may make various modifications and changes that will embody the principles of the invention and fall within the spirit and scope thereof.

What is claimed is:

1. A method for determining which, if any, of a selected audible logo and an announcement are provided to a calling party during setup of a direct-dialed (non-operator-assisted) telephone call placed by a calling party to a called party across at least one telecommunications network that carries the call on a trunk group from an originating line independently of any disposition of the called party, comprising the steps of:

establishing at least one attribute for the direct-dialed (non-operator-assisted) call initiated by the calling party;

comparing the attribute to pre-provisioned data that indicates whether at least one of an audible logo and announcement should be provided, and if so which of said audible logo(s) and announcement(s) should be provided;

determining if a match exists between said call attribute and said pre-provisioned data, and if so, then identifying which of audible logo(s) and announcement(s) should be provided;

providing to the calling party the audible logo(s) and announcement(s), if any, identified during said determining step independently of any disposition of the called party; and terminating the providing of the identified audible logo and/or announcement upon answering of the call by the called party.

2. The method according to claim 1 wherein the call attribute comprises at least a portion of a calling party number and wherein the pre-provisioned data comprises at least one list of calling party originating telephone number portion entries, each list entry having an associated indicator that indicates whether at least one of an audible logo and announcement should be provided, and if so, an identifier of the at least one of the logo and announcement to be provided.

3. The method according to claim 1 wherein the call attribute comprises at least a portion of a called party number and wherein the pre-provisioned data comprises at least one list of called party originating telephone number portion entries, each list entry having an associated indicator that indicates whether at least one of an audible logo and announcement should be provided, and if so, an identifier of the at least one of the logo and announcement to be provided.

4. The method according to claim 1 wherein the call attribute comprises at a Carrier Identification Code and wherein the pre-provisioned data comprises at least one list of Carrier Identification Code entries, each list entry having an associated indicator that indicates whether at least one of an audible logo and announcement should be provided, and if so, an identifier of the at least one of the logo and announcement to be provided.

5. The method according to claim 1 wherein the call attribute comprises at least one trunk group characteristic and wherein the pre-provisioned data comprises at least one list of trunk group characteristic entries, each list entry having an associated indicator that indicates whether at least one of an audible logo and announcement should be provided, and if so, an identifier of the at least one of the logo and announcement to be provided.

6. The method according to claim 1 wherein the call attribute comprises Originating Line Information (II digits) wherein the pre-provisioned data comprises at least one list of II digit entries, each list entry having an associated indicator that indicates whether at least one of an audible logo and announcement should be provided, and if so, an identifier of the at least one of the logo and announcement to be provided.

7. The method according to claim 1 wherein the call attribute includes at least two of the group including: (1) calling party number portion, (2) dialed number portion (3) Carrier Identification Code, (4) trunk group characteristic, and (5) Originating Line Information (II) digits, and the wherein the pre-provisioned data comprises corresponding lists of (1) calling party number portion entries, (2) dialed number portion entries (3) Carrier Identification Code entries, (4) trunk group characteristic entries, and (5) Originating Line Information (II) digit entries, each entry on each list an associated indicator that indicates whether at least one of an audible logo and announcement should be provided, and if so, an identifier of the at least one of the logo and announcement to be provided.

8. The method according to claim 7 wherein the call attribute comprises the combination of a called party number portion and a Carrier Identification Code, and wherein the pre-provisioned data comprises corresponding lists of called party number portion entries and Carrier Identification Code entries.

9. The method according to claim 7 wherein the call attribute comprises the combination of a calling and called party number portions, and wherein the pre-provisioned data comprises corresponding lists of calling and called party number portion entries.

10. The method according to claim 1 wherein an adjustment is made to a billing record for the call based on whether a message is provided, and if so, which message.

11. The method according to claim 10 wherein a credit is provided to the billing record when the calling party receives an audible message is provided.

12. The method according to claim 10 wherein the billing record is debited when a message is provided.

13. The method according to claim 10 wherein the billing record is debited when no message is provided.

* * * * *